(12) United States Patent
Morishita et al.

(10) Patent No.: US 8,924,475 B2
(45) Date of Patent: Dec. 30, 2014

(54) EMERGENCY RESPONSE CENTER

(76) Inventors: Kazuo Morishita, Fort Lee, NJ (US); Daniel Chung, Wayne, NJ (US); Seung Park, Si Heung-Si (KR); Guo Lee, Shanghai (CN)

(*) Notice: Subject to any disclaimer, the term of this patent is extended or adjusted under 35 U.S.C. 154(b) by 442 days.

(21) Appl. No.: 13/303,981

(22) Filed: Nov. 23, 2011

(65) Prior Publication Data
US 2012/0169832 A1 Jul. 5, 2012

(51) Int. Cl.
G06F 15/16 (2006.01)
H04N 7/14 (2006.01)
H04N 7/18 (2006.01)

(52) U.S. Cl.
CPC .............. *H04N 7/181* (2013.01); *H04N 7/141* (2013.01)
USPC ........................................................ 709/204

(58) Field of Classification Search
CPC . H04N 7/141; H04N 7/181; H04N 19/00581; G06F 9/541; G06F 7/0609
USPC ........................................................ 709/204
See application file for complete search history.

(56) References Cited

U.S. PATENT DOCUMENTS

| | | | |
|---|---|---|---|
| 7,551,337 B2 * | 6/2009 | Hirakawa et al. | 359/204.1 |
| 8,570,169 B2 * | 10/2013 | Green et al. | 340/540 |
| 2001/0022862 A1 * | 9/2001 | Alm | 382/305 |
| 2004/0068346 A1 * | 4/2004 | Boucher | 700/241 |
| 2006/0215024 A1 * | 9/2006 | Coonce et al. | 348/143 |
| 2012/0331054 A1 * | 12/2012 | Dasgupta | 709/204 |

* cited by examiner

Primary Examiner — Mohammad Islam
(74) Attorney, Agent, or Firm — Marc D. Lowy

(57) ABSTRACT

The present invention is an Emergency Response Center (ERC) which provides a variety of emergency and information functions in public environments. The ERC operates in a number of modes, including Information Mode, Emergency Response Mode, Security Mode, and Surveillance Mode. The Emergency Response Center functions are software selectable on a large video touch screen. A video screen displays emergency information to users and allows videoconferencing with various authorities as well as any individuals that own the account and apparatus. News, maps, weather, store directories, and other non-emergency information are also displayed by the ERC. The ERC can conduct surveillance of passersby using video cameras configured to stream and record the area in the vicinity of the ERC. The ERC can also scan employee IDs, capture employee facial images, and register employee data in the ERC database. An ERC server allows remote administration of the ERC.

12 Claims, 20 Drawing Sheets

Record Video data while deleting obsolete data continuously (Period specified by customer up to 2 weeks) — 1200

FIG. 9A

Wait for "Maintenance" QR code to be scanned — 1265

Detect "Maintenance" QR code scan — 1267

Display maintenance menu on main screen and advertisement on sub-screen — 1269

Detect no entry for set period or "Close" selection — 1380

Detect surveillance menu selection — 1270

Display surveillance menu on main screen and advertisement on sub-screen — 1280

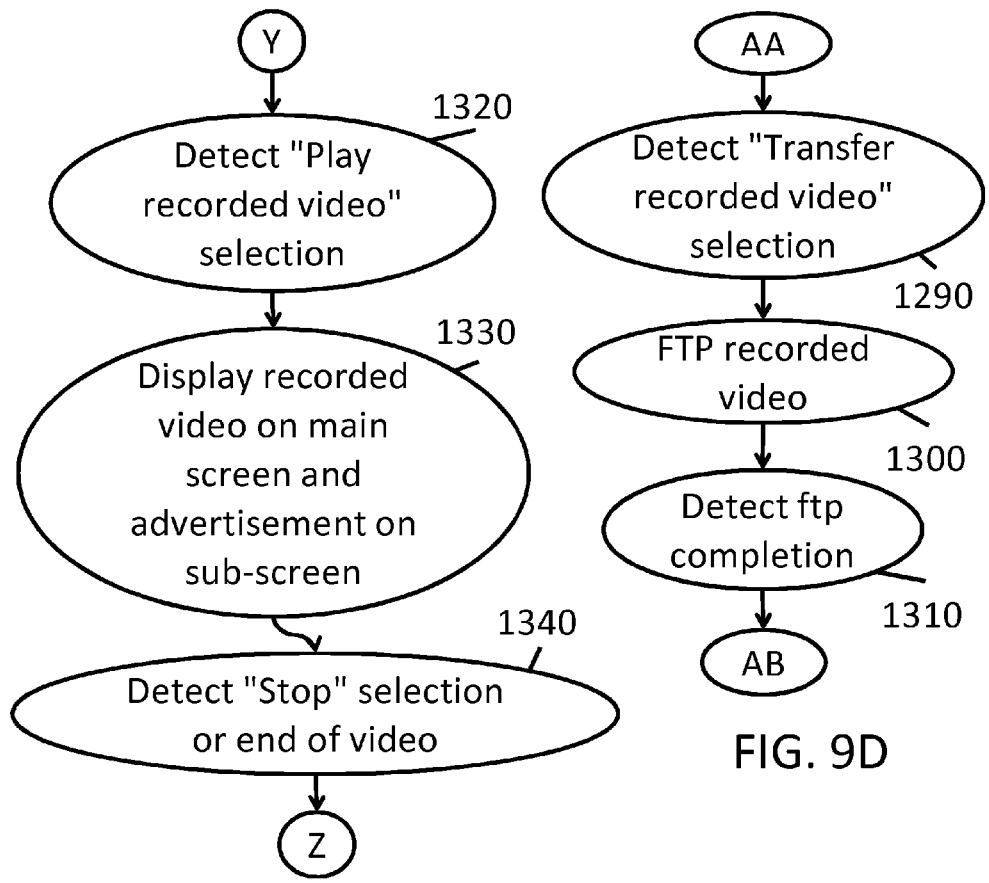
FIG. 9C
FIG. 9D
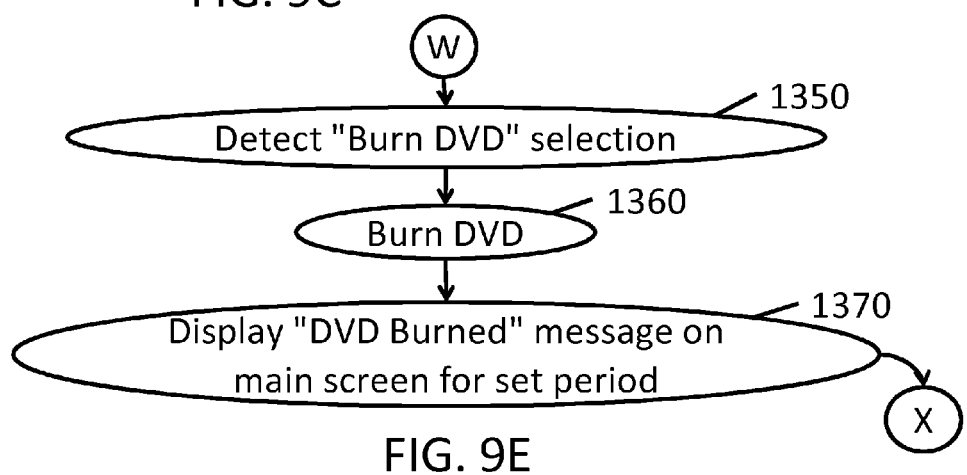
FIG. 9E

EMERGENCY RESPONSE CENTER

CROSS-REFERENCE TO RELATED APPLICATIONS (Not Applicable.)

STATEMENT REGARDING FEDERALLY SPONSORED RESEARCH AND DEVELOPMENT (Not Applicable.)

FIELD OF THE INVENTION

This invention relates to emergency response machines, and more particularly to a novel emergency response center.

DISCUSSION OF RELATED ART

The present invention relates generally to emergency response machines, and more particularly to a multifunction emergency response center (ERC) which provides a significant variety of useful functions.

The present invention is a emergency response center providing a combination of advanced features which do not appear to be addressed by current technologies. The present invention includes, among other features, the ability to display emergency information, conduct video conferencing with various authorities, the ability to display video advertisements, and display shopping, news, and weather information. Other useful and/or novel features include the ability to print user coupons, and the ability to store transaction data.

Clearly there is a need for a emergency response center which will offer the advanced features described above. The present invention accomplishes these objectives.

SUMMARY OF THE INVENTION

The present invention is an Emergency Response Center (ERC). The Emergency Response Center operates in a number of modes, including Information Mode, Emergency Response Mode, Security Mode, and Surveillance Mode. The Emergency Response Center functions are software selectable on a large video touch screen.

The Emergency Response Mode functions include displaying visual emergency messages on one or more video touch screens, playing audio emergency messages, videoconferencing with Emergency Medical Services, videoconferencing with local police, family members, and friends, and storage of emergency response kits and emergency medical equipment. An uninterruptible power supply (UPS) keeps the Emergency Response Center operational for a limited period if electrical power is lost. An ERC server provides remote access to each ERC connected via the TCP/IP (Internet). Emergency response training videos can be updated/replaced from the ERC server. The updates can be performed locally as well if the user decides to do so. A TV antenna external to the ERC and a tuner incorporated in the PC allow the ERC to display the emergency alert messages.

Information Mode provides a number of services including displaying local maps and store directories, displaying weather conditions, displaying news and entertainment information, displaying video advertisements, sending text coupons to a user's cell phone, printing coupons, vending and sale of software applications and movie tickets and other legitimate products. The web link for the information can be updated from the ERC server. The updates can be performed locally as well if the user decides to do so.

Surveillance Mode functions include conducting surveillance of passersby using video cameras configured to stream and record the area in the vicinity of the Emergency Response Center, and sending e-mail/text warnings including the date, time, photo, and camera number to a designated security company or e-mail address when a registered wanted individual is detected and when he/she is lost from the view. The surveillance video data can be transferred to the ERC server for further analysis. The updates can be performed locally as well if the user decides to do so.

Security Mode functions include scanning employee IDs, capturing employee facial images, unlocking doors/gates for set periods, and registering employee images and data in the ERC database. The registered data can be updated from the ERC server. The updates can be performed locally as well if the user decides to do so.

The ERC is controlled by an IBM compatible PC configured for storing and retrieving data and a computer operating system running a proprietary software program. Also included in the ERC are a coupon printer, a magnetic stripe card reader, a TV tuner, a DVD drive, and a barcode scanner.

An uninterruptible power supply (UPS) provides power to run the ERC for extended periods of time during power blackouts. The ERC utilizes the TV tuner mounted in the PC to receive an EAS signal and to display the EAS message.

Other features and advantages of the present invention will become apparent from the following more detailed description, taken in conjunction with the accompanying drawings, which illustrate, by way of example, the principles of the invention.

DESCRIPTION OF THE DRAWINGS

FIG. 9A is a state machine diagram of the present invention in Surveillance Mode;
FIG. 9B is a state machine diagram of the present invention in Surveillance Mode;
FIG. 9C is a state machine diagram of the present invention in Surveillance Mode;

FIG. 9D is a state machine diagram of the present invention in Surveillance Mode;

FIG. 9E is a state machine diagram of the present invention in Surveillance Mode;

DETAILED DESCRIPTION OF THE PREFERRED EMBODIMENT

Figure 1:
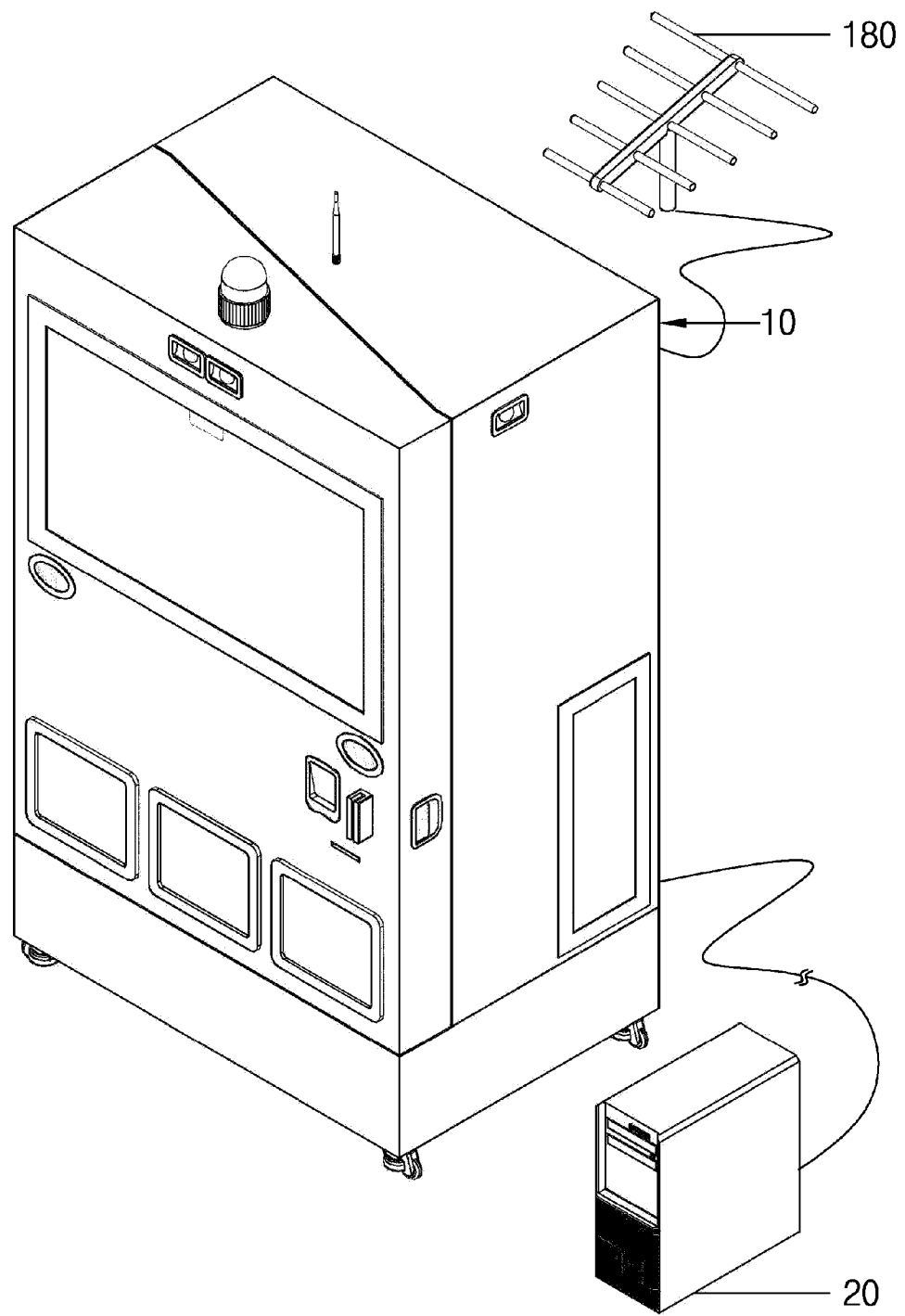
FIG. 1 is a front perspective view of the present invention.
Figure 2:
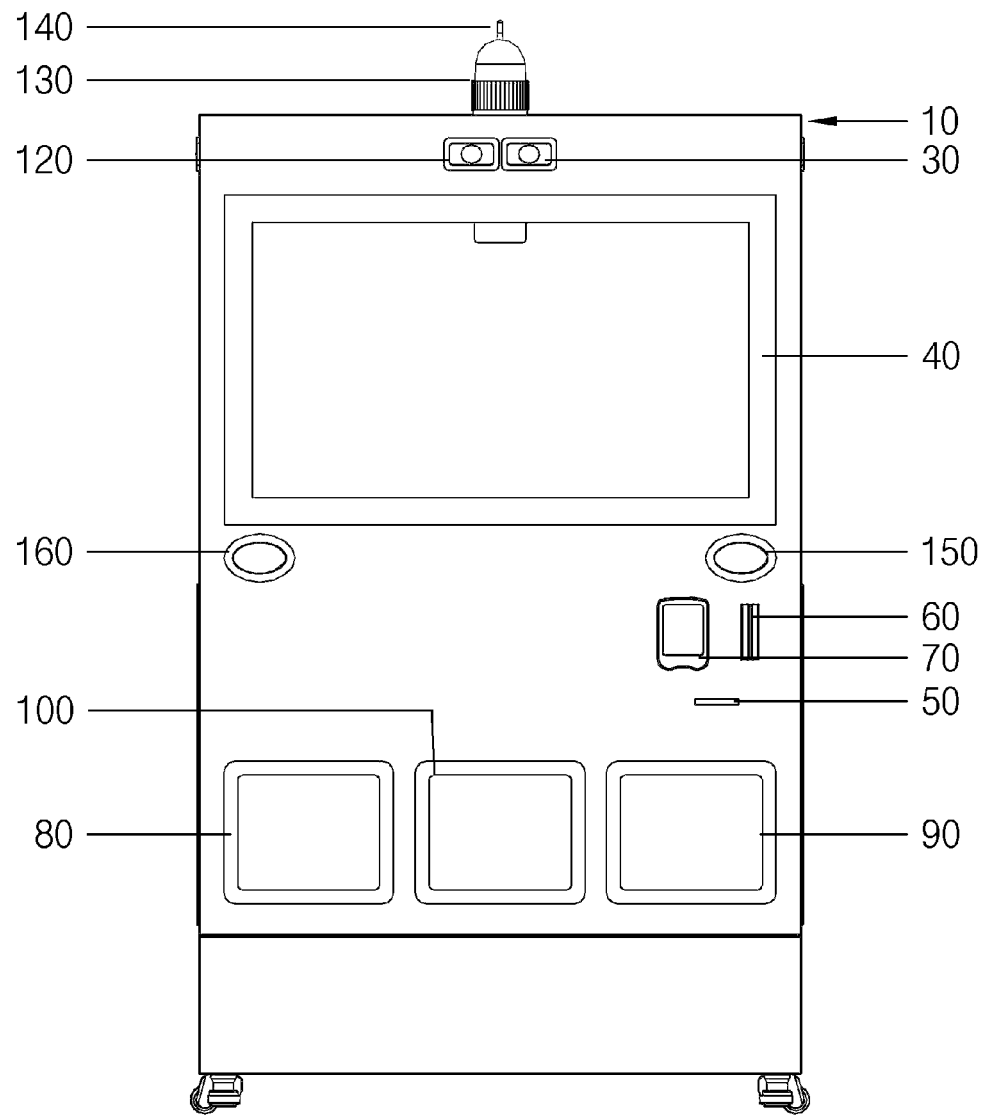
FIG. 2 is a front view of the present invention.

The present invention, an Emergency Response Center 10 (ERC), is shown in FIG. 1. The Emergency Response Center 10 operates in a number of modes, including Information Mode, Emergency Response Mode, Security Mode, and Surveillance Mode. The Emergency Response Center 10 functions are software selectable on a large video touch screen 40 (FIG. 2).

The Emergency Response Mode functions include displaying visual emergency messages on the touch screen 40, playing audio emergency messages, videoconferencing with Emergency Medical Services, videoconferencing with local police, family members, and friends, and storage of emergency response kits and emergency medical equipment. An uninterruptible power supply (UPS) 1630 keeps the Emergency Response Center 10 operational for a limited period if electrical power is lost. An ERC server 20 provides remote access to each ERC 10 connected via the TCP/IP (Internet). A TV Antenna 180 allows the ERC 10 to receive Emergency Alert System (EAS).

Information Mode provides a number of services including displaying local maps and store directories, displaying weather conditions, displaying news and entertainment information, displaying video advertisements, sending text coupons to a user's cell phone, printing coupons, vending and sale of software applications and movie tickets and other legitimate products.

Surveillance Mode functions include conducting surveillance of passersby using video cameras 120, 270, 170, 260 configured to stream and record the area in the vicinity of the Emergency Response Center 10, and sending e-mail/text warnings including the date, time, photo, and camera number to a designated security company or e-mail address.

Security Mode functions include scanning employee IDs, capturing employee facial images, unlocking doors/gates for set periods, and registering employee images and data in the ERC 10 database.

Turning now to FIG. 2, a front view of the Emergency Response Center 10 is shown. The wi-fi antenna 140 is used to receive network data where TCP/IP access is available. The warning light 130 lights up and rotates when any of the cabinets 80, 90, 100 are opened, and/or the emergency alert message is received for a preset time, or until an "End-of-Message" is received. Front Cabinet 1 80, front cabinet 2 100, and front cabinet 3 90 provide storage of emergency supplies.

A front surveillance camera 120 is mounted at a strategic location on the Emergency Response Center 10 to record user interaction with the ERC 10. With the cameras 120, 270, 170, 260, the ERC records video and audio data from the area surrounding the invention. If the Emergency Response Center 10 is vandalized, the vandal may be identified using the recorded video output of the surveillance cameras 120, 270, 170, 260. Using a wired or wireless connection on the ERC 10, the videos can be viewed at remote locations as well as locally. The security camera 30 also provides videoconferencing when an emergency alert message is received.

One or more video touch screens 40 display video advertisements, step-by-step user instructions, transaction information, public information, emergency alert messages, and warnings. From the touch screen 40 users can make a choice of coupons and various other functions. During emergency conditions, a warning light 130 emits visible warnings, a left speaker 150 and a right speaker 160 emit audio warnings, and TV video is displayed to users in the vicinity of the Emergency Response Center 10.

A magnetic stripe card reader 60 and bar-code scanner 70 scan user IDs which can be in the form of a magnetic stripe card or a 1D/2D bar code. Coupons are dispensed to the users by a coupon printer/dispenser 50.

Figure 3:
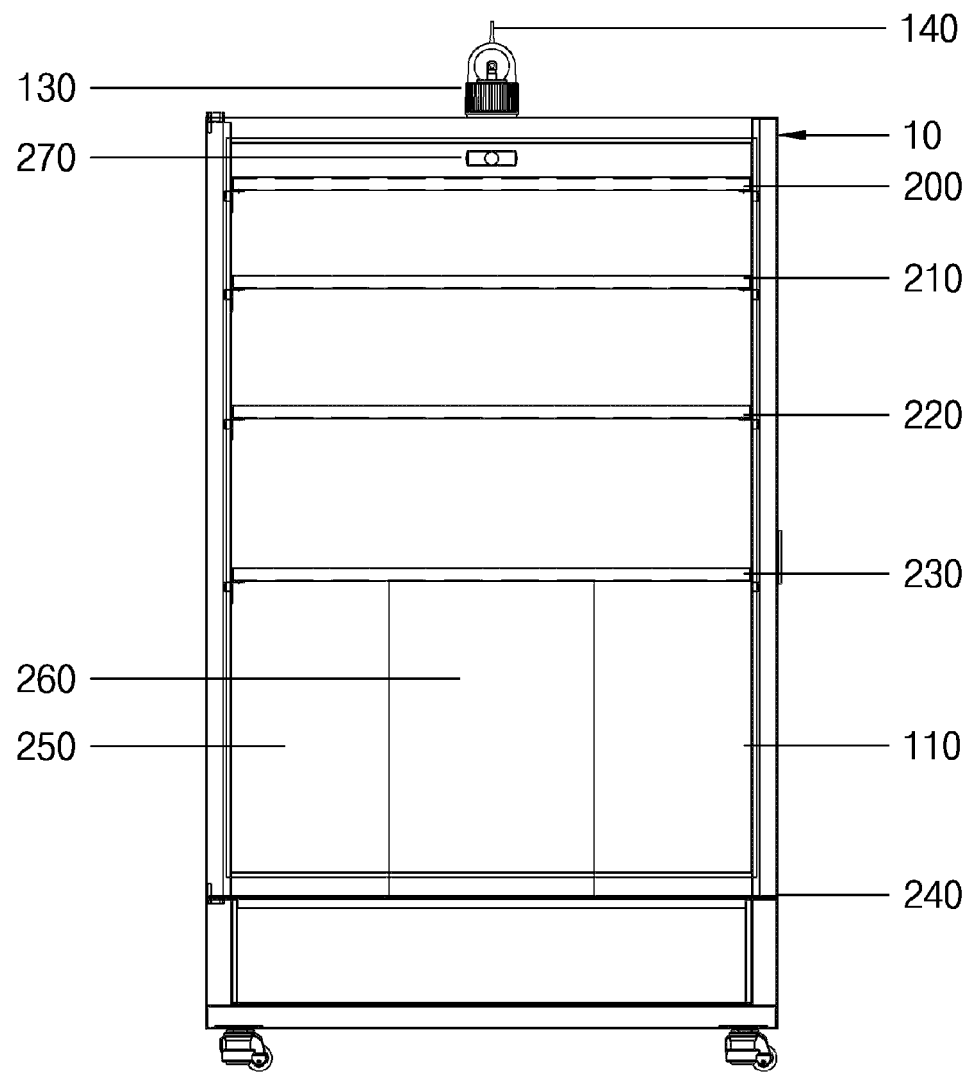
FIG. 3 is a front internal view of the present invention.

Referring now to FIG. 3, five shelves 200,210,220,230,240 provide storage space for emergency supplies, such as emergency response kits, masks and protective apparel. A left cabinet 110, a middle cabinet 260, and a right cabinet 250 also provide storage space for emergency supplies such as first aid kits, stretchers, defibrillators, and hazardous materials response kits. With the front door removed, the rear surveillance camera 270 can be seen.

Figure 4:
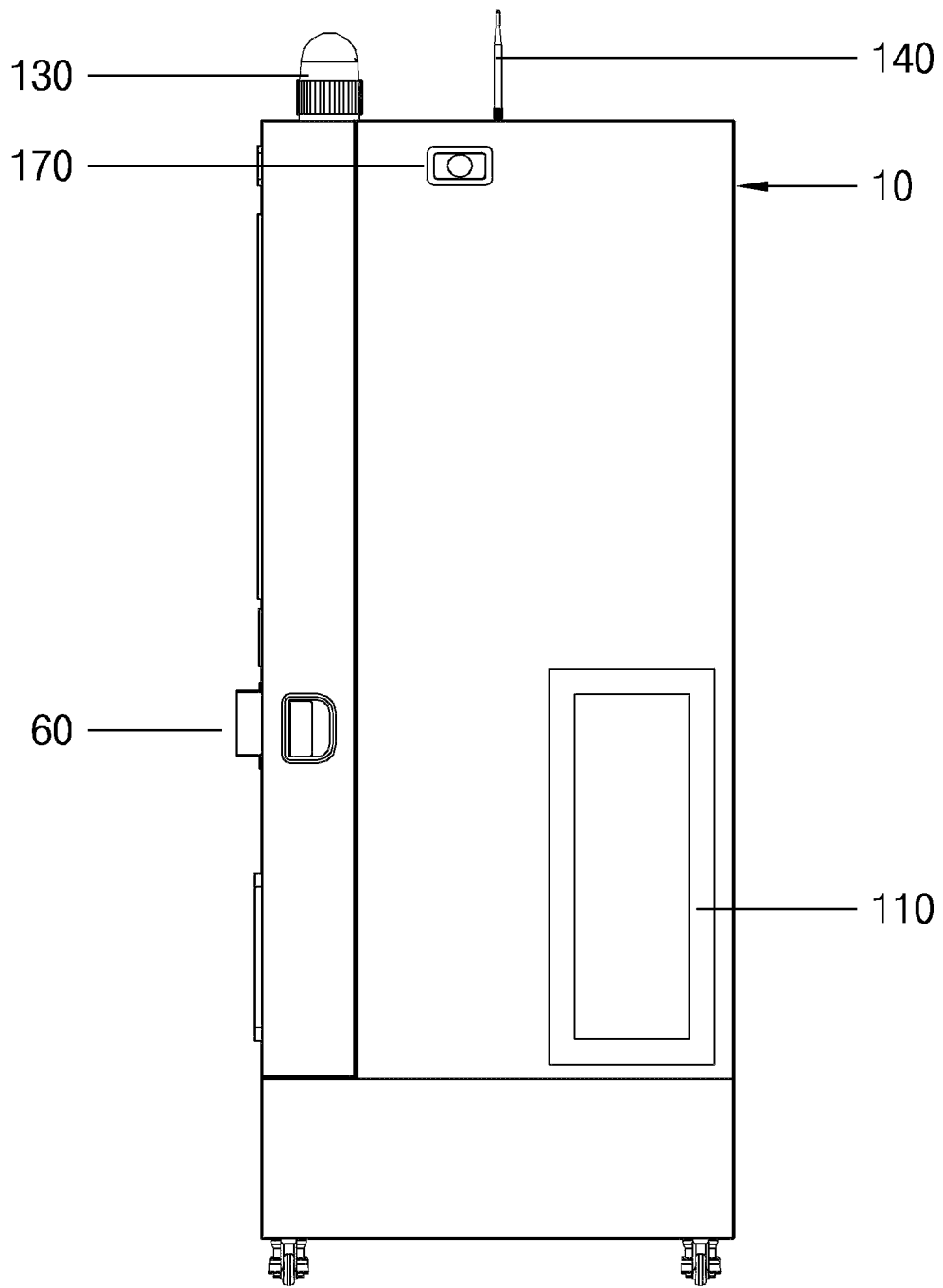
FIG. 4 is a left side view of the present invention.
Figure 5:
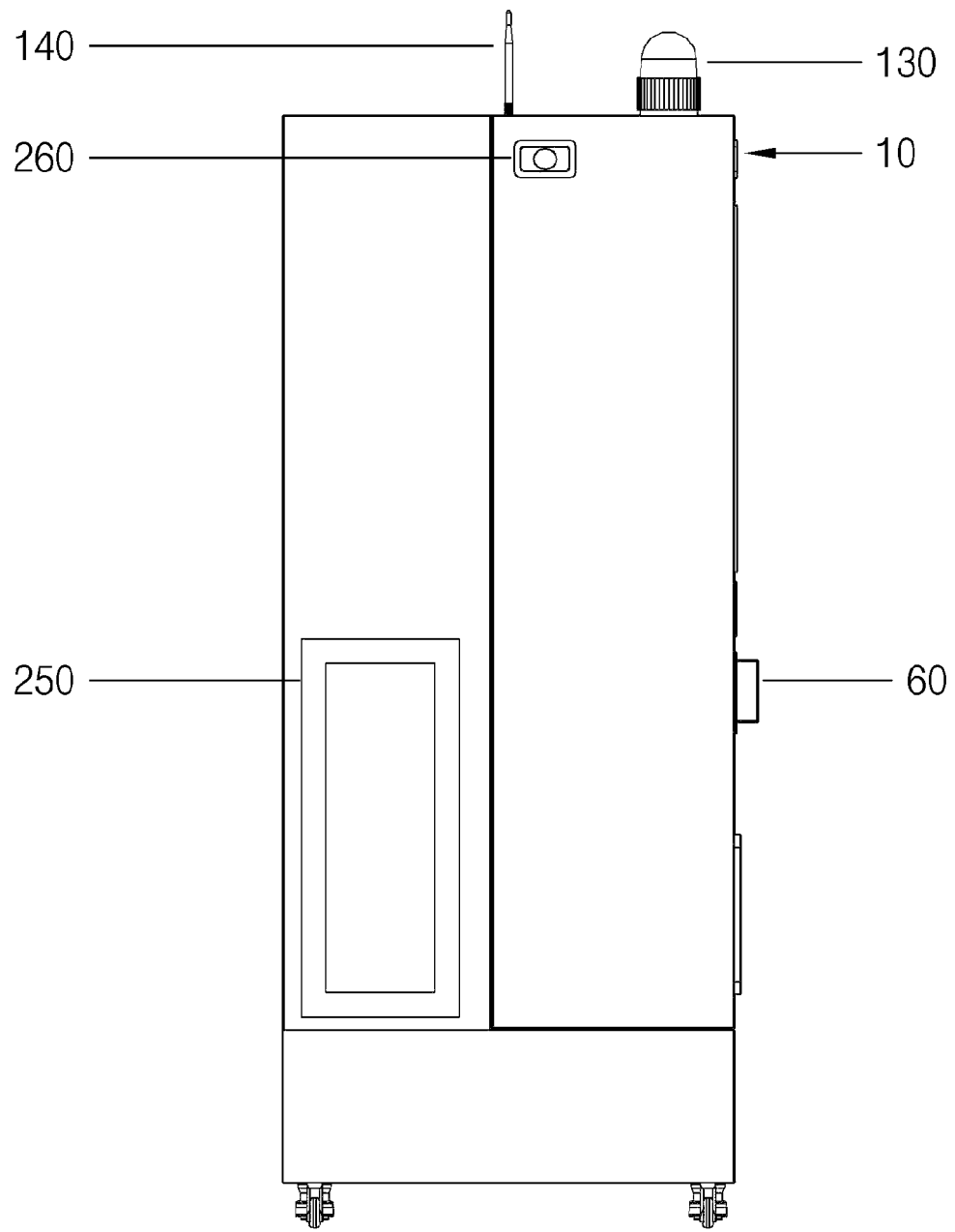
FIG. 5 is a right side view of the present invention.

In FIG. 4 a left side view of the invention is shown. The left surveillance camera 30 and left cabinet 110 are visible. In FIG. 5 a right side view of the invention is shown. The right surveillance camera 260 and right cabinet 250 are visible.

Figure 10A:
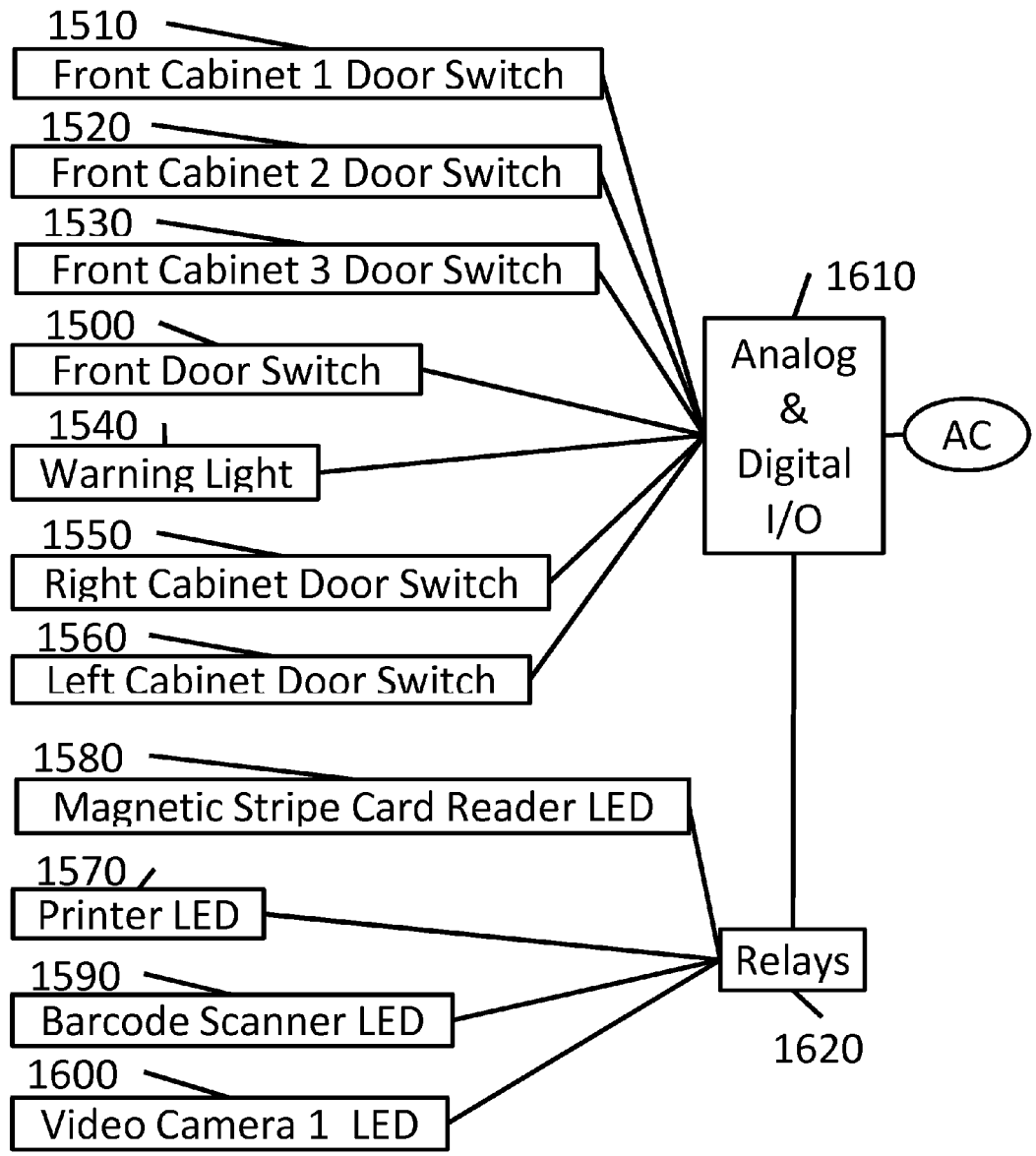
FIG. 10A is an electronic block diagram of the present invention.
Figure 10B:
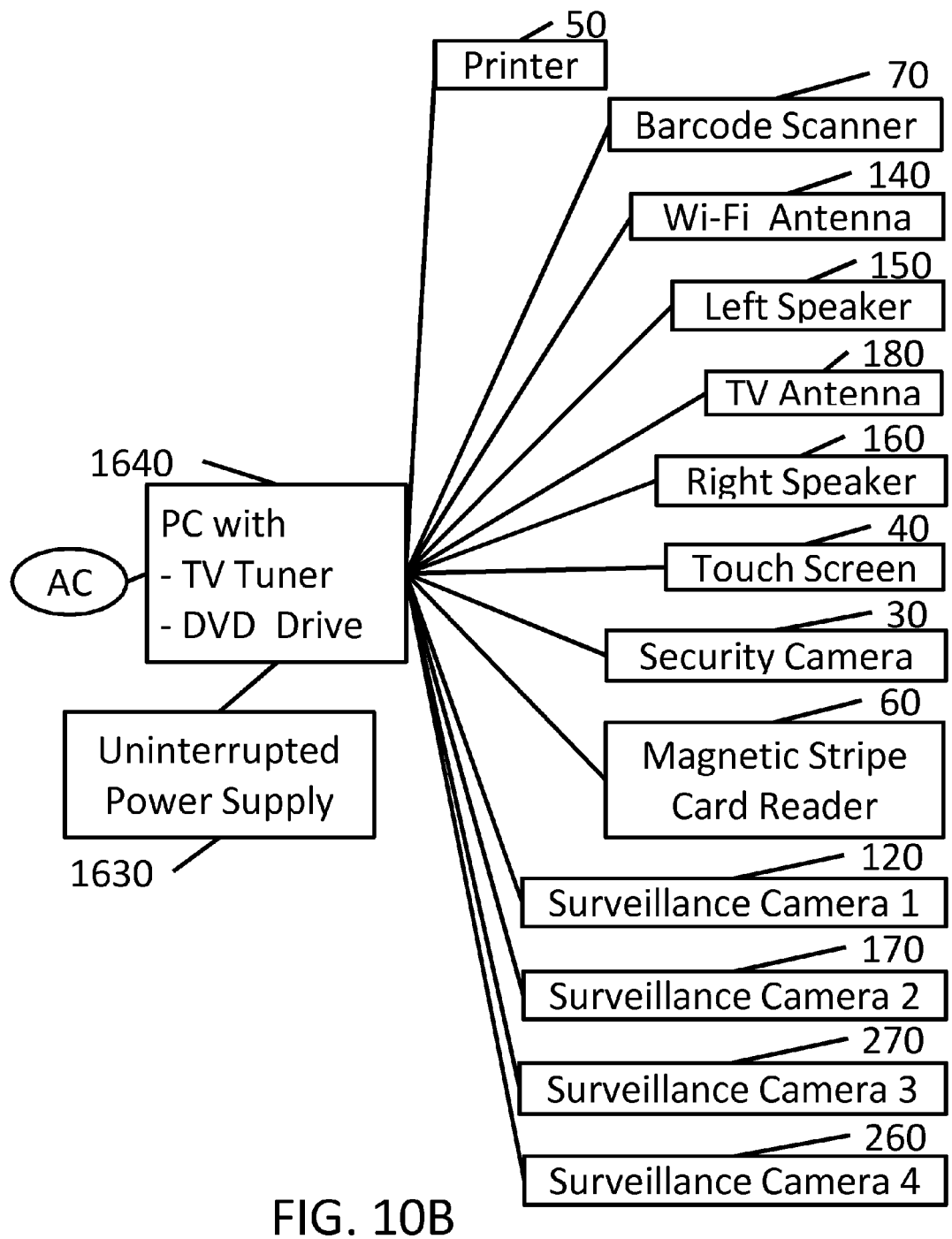
FIG. 10B is an electronic block diagram of the present invention.

Referring now to FIGS. 10A, 10B, block diagrams of the ERC 10 components are shown. Four front door switches 1500, 1510, 1520, and 1530, signal the PC 1640 when the front door is open. Right cabinet door switch 1550 and left cabinet door switch 1560 signal the ERC when the cabinet doors are open. The switches 1500 to 1560 connect to an analog & digital I/O device 1610. A printer LED 1570, a magnetic stripe card reader LED 1580, a bar-code scanner LED 1590, and a video camera LED 1600 are connected through relays 1620 which connect to the analog & digital I/O device 1610, which connects to an IBM compatible PC (personal computer) 1640. The PC 1640 includes a storage system configured for storing and retrieving data, a computer operating system running a proprietary software program, a TV tuner, and a DVD drive.

An uninterruptible power supply (UPS) 1630 provides power to run the ERC 10 for extended periods of time during power blackouts. The ERC 10 utilizes the TV antenna 180 and the TV tuner mounted in the PC 1640 to receive an Emergency Alert System (EAS) signal and to display the EAS message.

Figure 6A:
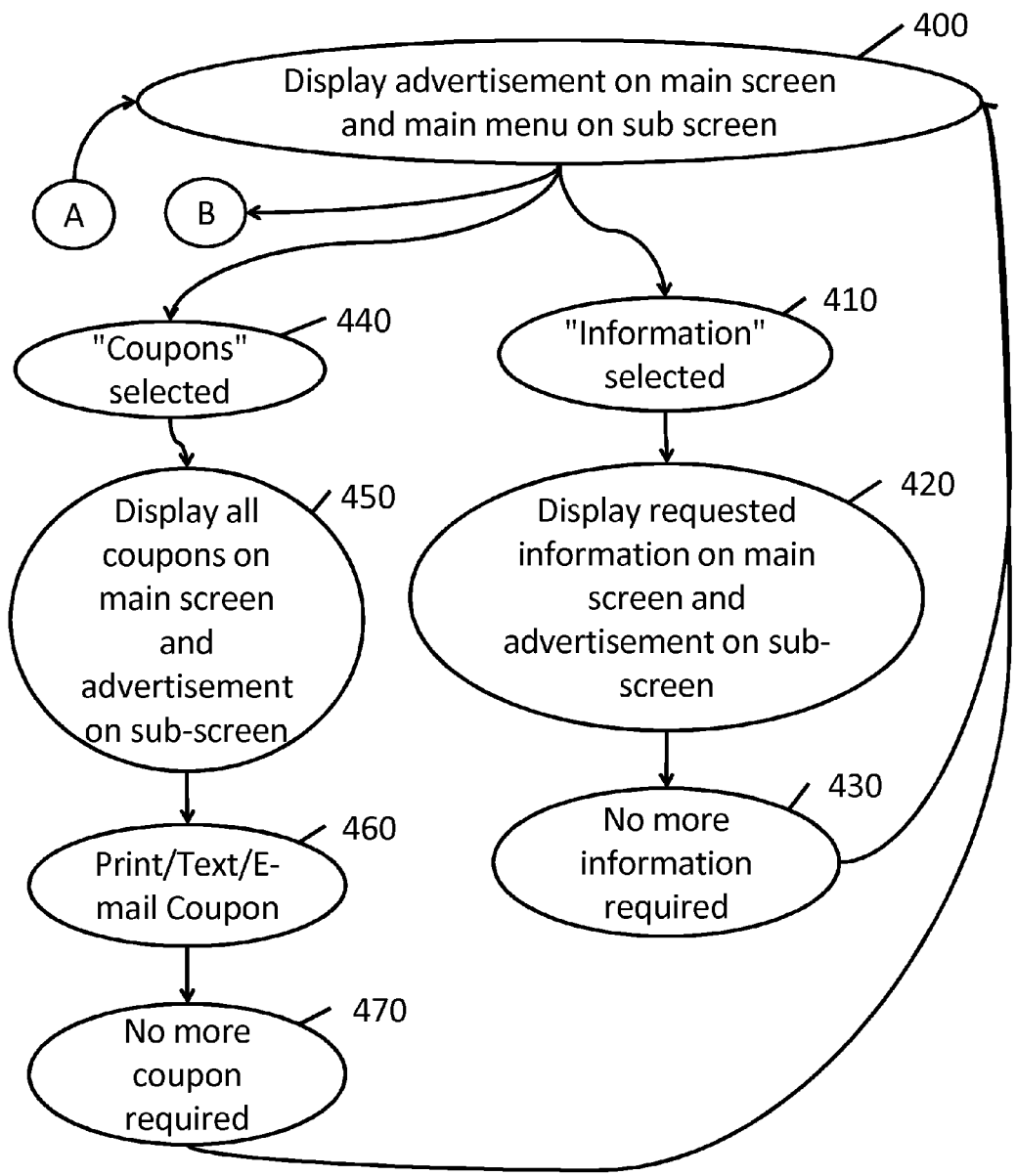
FIG. 6A is a state machine diagram of the present invention in Normal Mode.
Figure 6B:
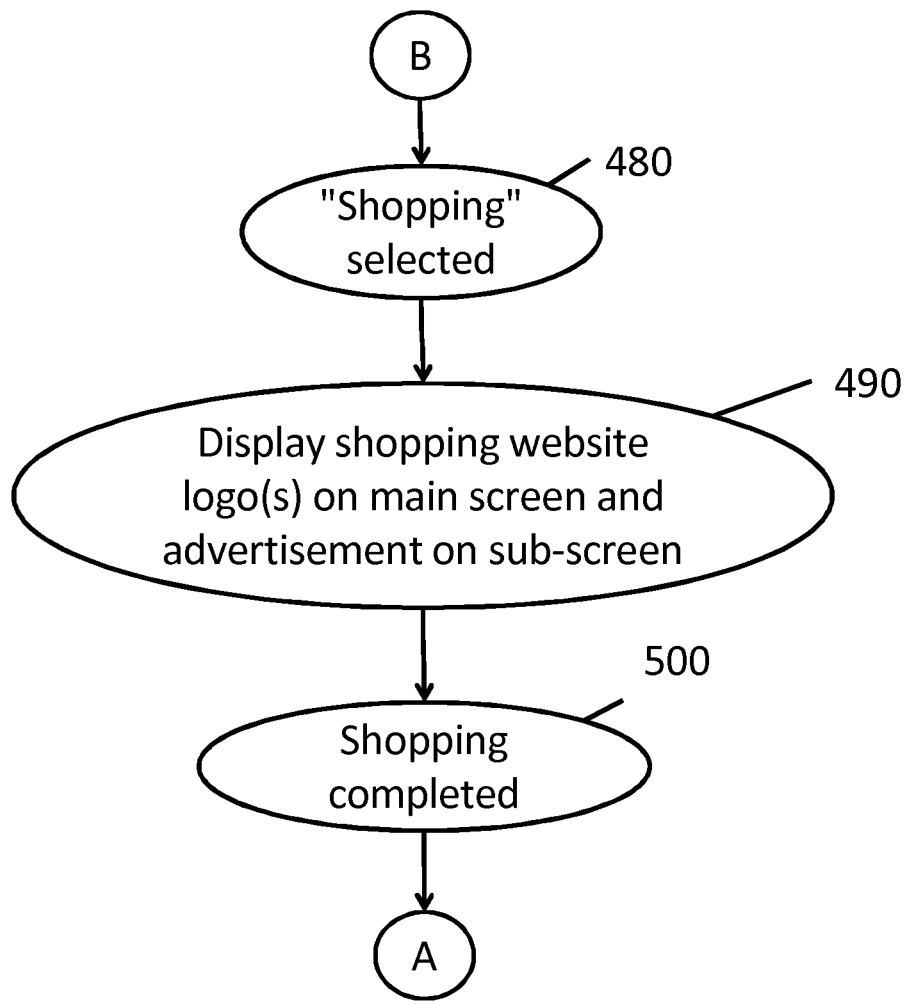
FIG. 6B is a state machine diagram of the present invention in Normal Mode.

Referring now to FIGS. 6A,6B, state machine diagrams of the Information Display functions of the Emergency Response Center 10 operating in Normal mode are illustrated. In the first operational state, (step 400), video files containing advertisement(s) are displayed on the video screen 40. In state 480 the user has selected shopping functions. Shopping website(s) and/or links are displayed on the video screen in state 490, and when shopping is completed, the ERC returns to the main menu (state 500). In state 440, the user has selected "Coupons" and all available coupons for the user to choose from are displayed (state 450), along with an advertisement. The ERC 10 users supply image files containing the coupons. In state 460 coupons are texted, e-mailed, or printed based on user selections. When no more coupons are requested, the ERC returns to the main menu (state 470). In state 410 the user has selected "Information", which may consist of websites and/or links The requested Information is displayed on the video screen 40, along with an advertisement (state 420). When no further information is requested, the ERC returns to the main menu (state 430).

Figure 6C:
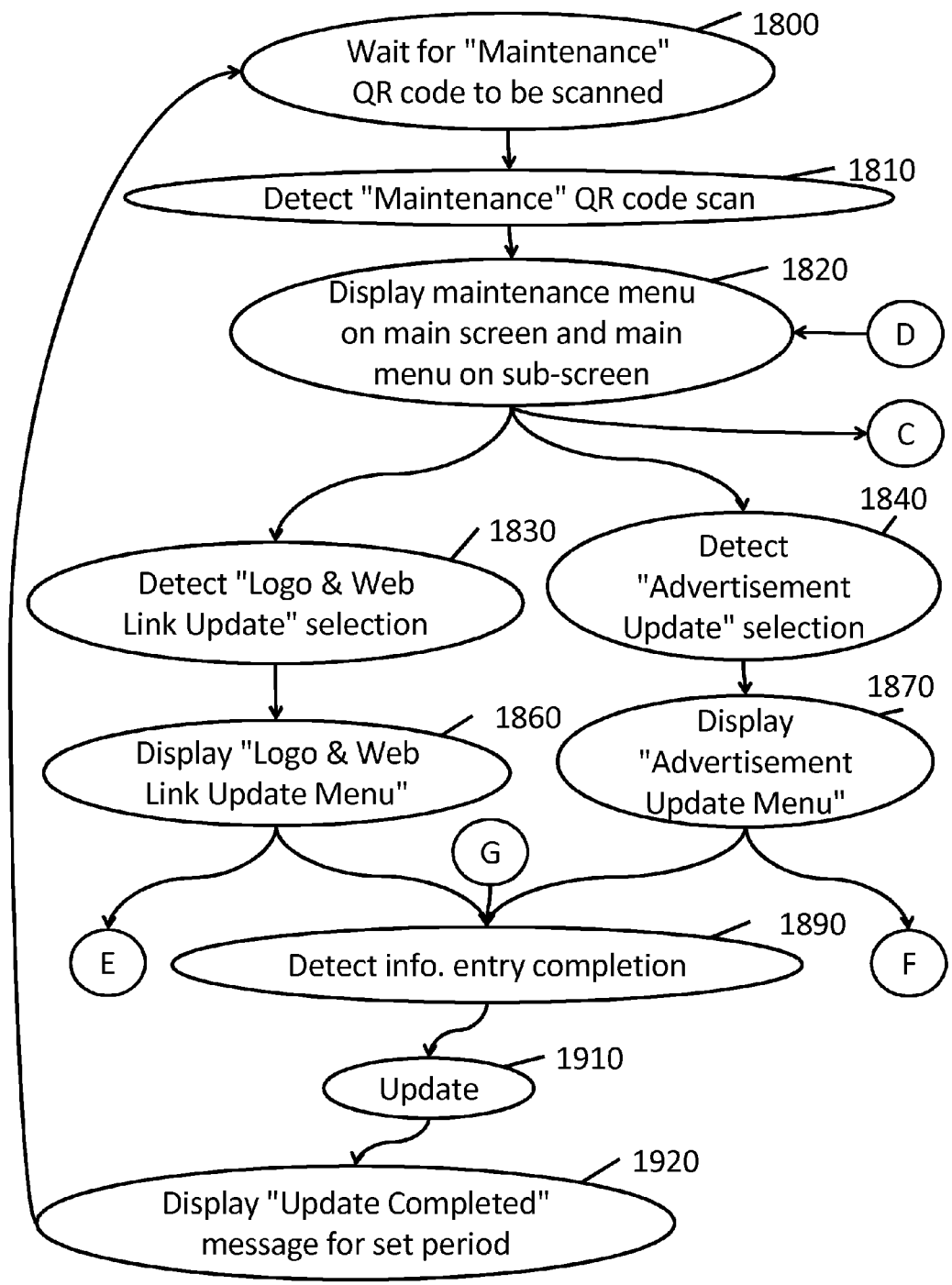
FIG. 6C is a state machine diagram of the present invention in Normal Mode.
Figure 6D:
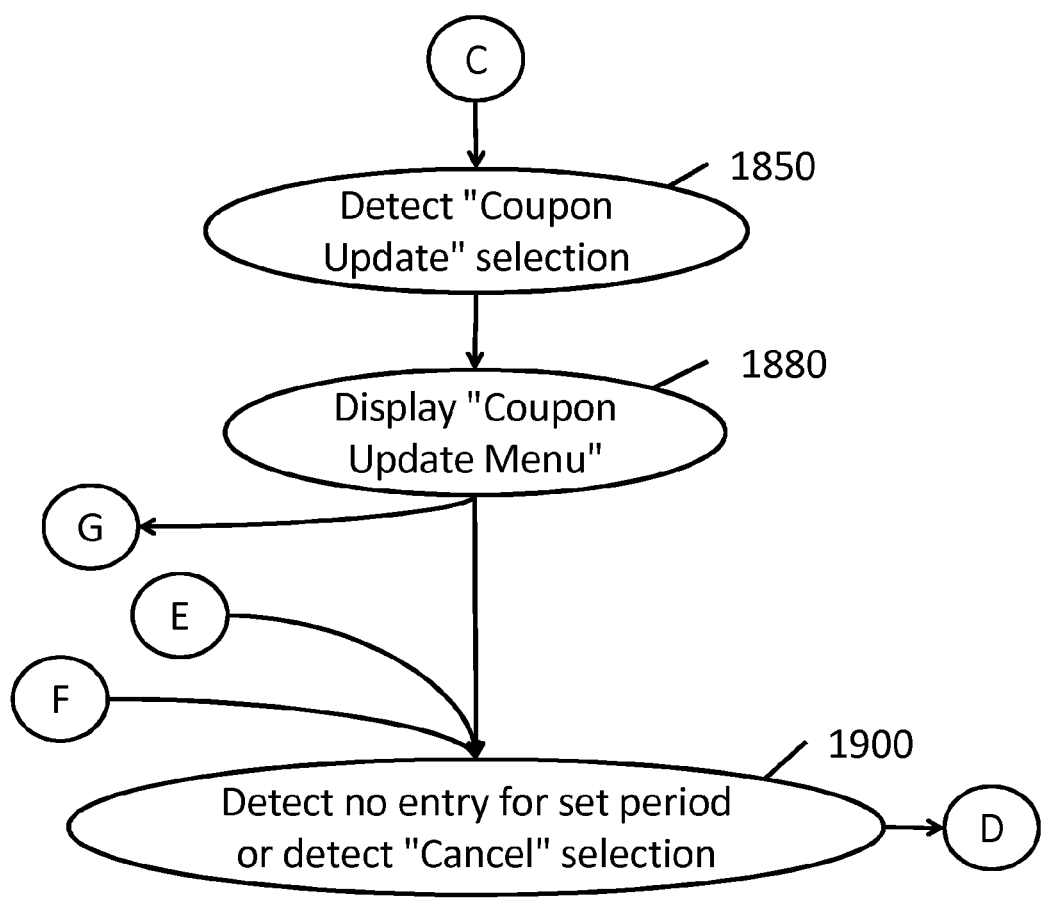
FIG. 6D is a state machine diagram of the present invention in Normal Mode.

In FIGS. 6C, 6D, state machine diagrams of the Information Maintenance functions of the Emergency Response Center 10 operating in Normal mode are illustrated. The ERC 10 is waiting for a Maintenance code to be scanned in state 1800. When the ERC 10 detects a Maintenance code scan, it displays the Maintenance menu on the video display 40 (states 1810, 1820). If the user selects "Logo & Web Link Update" (state 1830), the "Logo & Web Link Update" menu is displayed, and the user may enter information (states 1860, 1890). The updated information is received, an "Update Completed" message is displayed (states 1910, 1920), and the ERC 10 returns to the Maintenance code scan wait (state 1800). If the user selects "Advertisement Update" (state 1840), the "Advertisement Update" menu is displayed, and the user may enter information (states 1870, 1890). The updated information is received, an "Update Completed" message is displayed (states 1910, 1920), and the ERC 10 returns to the Maintenance code scan wait (state 1800). If the user selects "Coupon Update" (state 1850), the "Coupon Update" menu is displayed, and the user may enter information (states 1880, 1890). The updated information is received, an "Update Completed" message is displayed (states 1910, 1920), and the ERC 10 returns to the Maintenance code scan wait (state 1800). If no user entry is received at any update menu for a set period, then the update selections return to the Maintenance menu (state 1820).

Figure 7A:
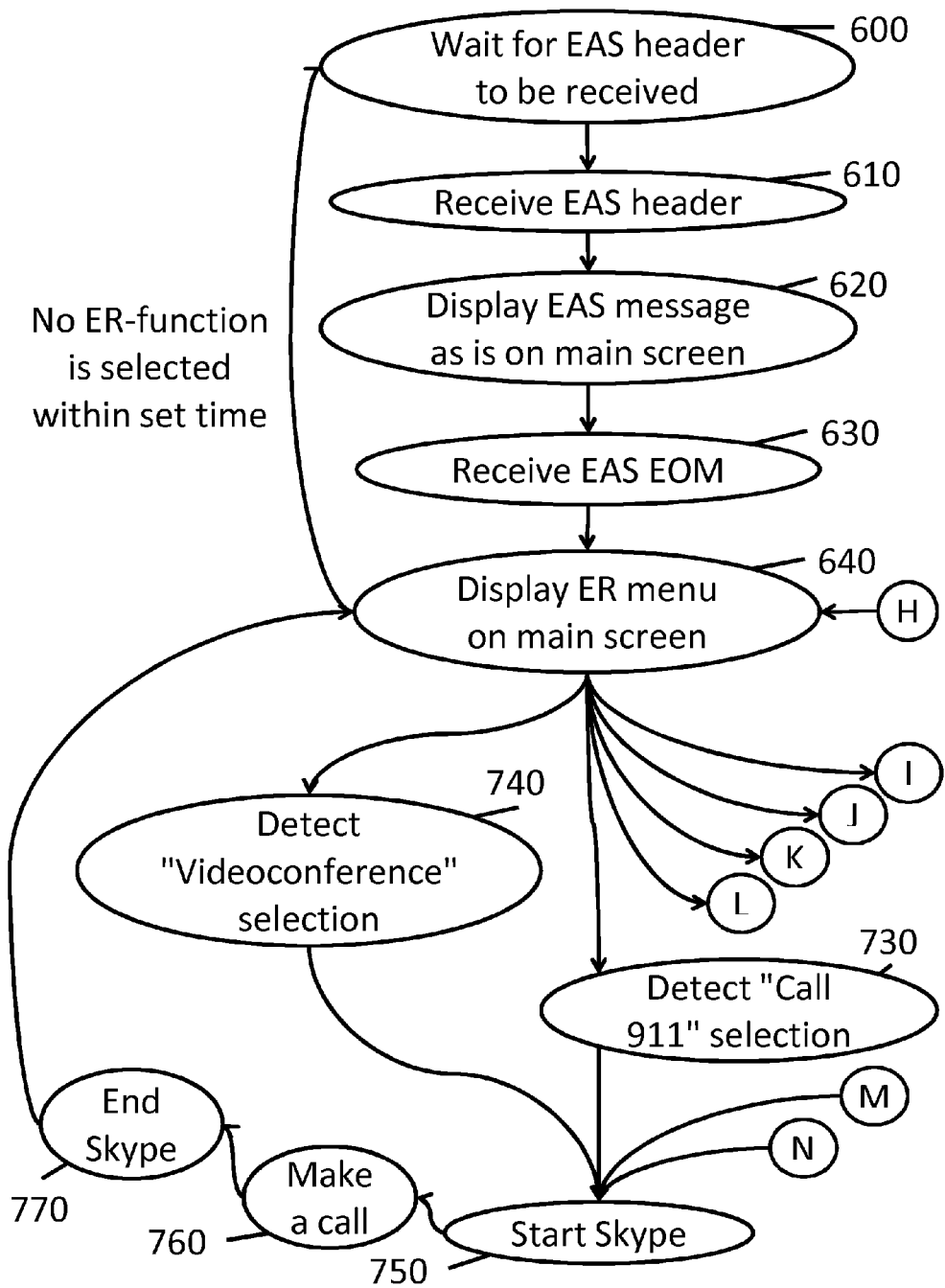
FIG. 7A is a state machine diagram of the present invention in Emergency Alert Mode.
Figure 7B:
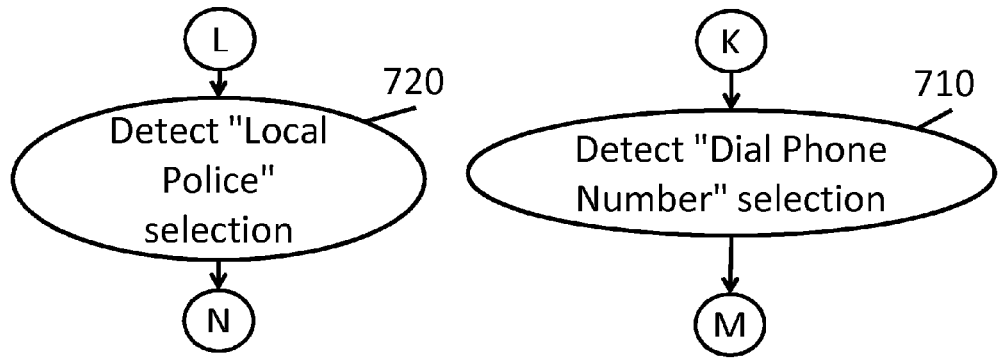
FIG. 7B is a state machine diagram of the present invention in Emergency Alert Mode.
Figure 7C:
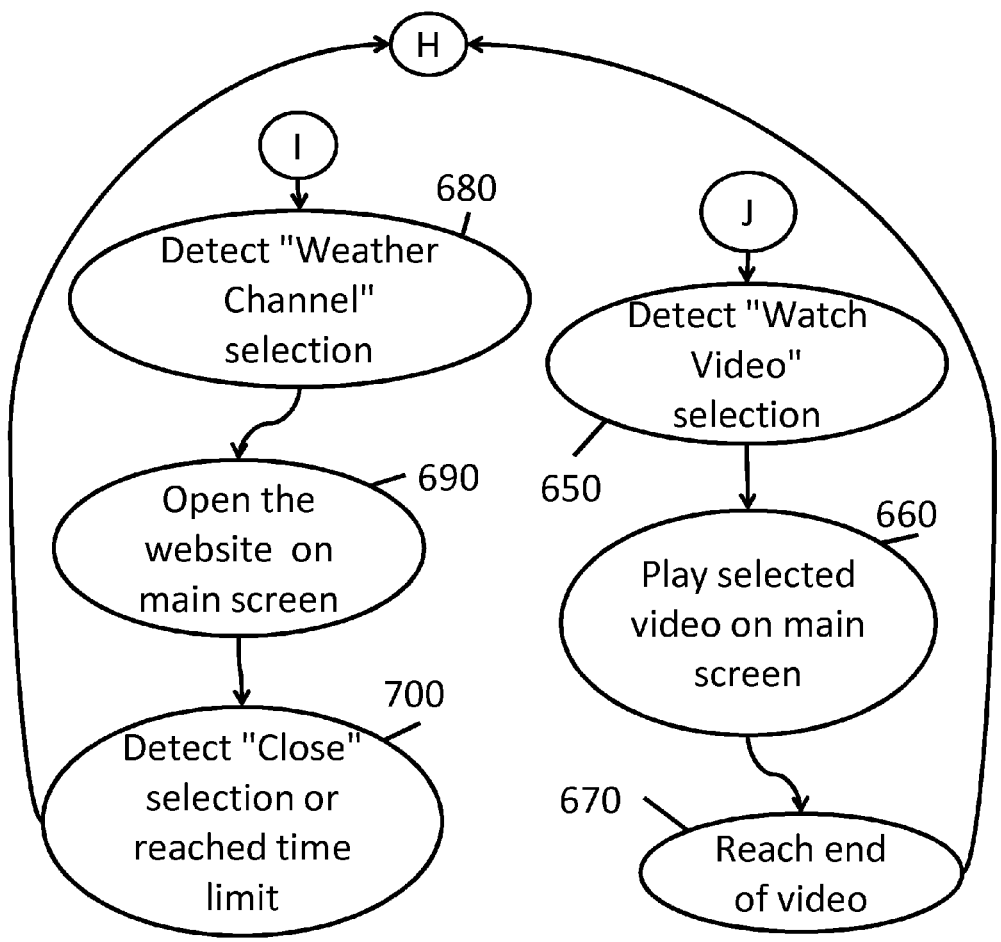
FIG. 7C is a state machine diagram of the present invention in Emergency Alert Mode.

In FIGS. 7A, 7B, 7C, a state machine diagram of the Emergency Response Center 10 operating in Emergency Alert mode is illustrated. The PC 1640 waits for the EAS header to be received (state 600). The PC 1640 receives the EAS header and displays it in states 610, 620. Next the EAS end of message (EOM) is received in state 630, and the ER menu is displayed on the video screen 40 (states 630, 640). In state 640 the emergency response main menu is displayed to the users with a number of selections. If the user selects "Videoconference" (State 740), "Call 911" (State 730), "Local Police" (State 720), or "Dial Phone Number" (State 710), an Internet video or telephone session, using Skype or a similar service, is initiated (state 750). The Internet video or telephone session is completed and the ERC returns to the ER menu (states 760, 770). From the ER menu, a "Weather Channel" may be selected (state 680), which then displays the weather website on the video screen 40, and returns to the ER menu (states 690, 700). "Watch Video" may also be selected from the ER menu, so that the selected emergency response video is played for educational or training purposes (state 660). The ERC 10 returns to the ER menu at the completion of the video (state 670).

Figure 8A:
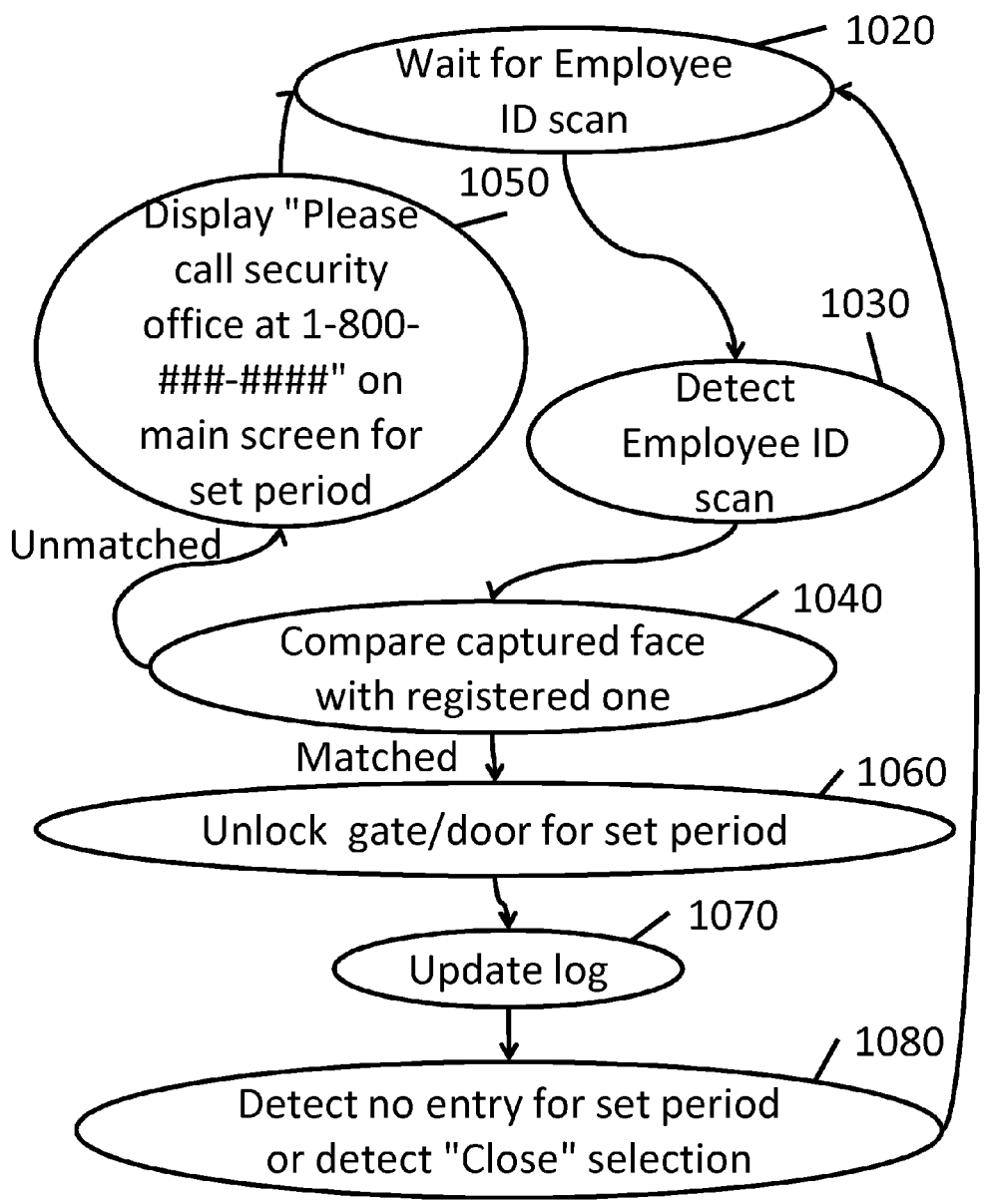
FIG. 8A is a state machine diagram of the present invention in Security Mode.

Referring now to FIG. 8A, state machine diagrams of the Emergency Response Center 10 operating in Security Mode, Entrance Control are illustrated. In state 1020 the ERC 10 is waiting for an employee to scan their ID using the magnetic stripe card reader 60 or the bar-code scanner 70. When an ID scan is detected, an image of the employee's face is captured, and compared with a registered image of the employee's face (states 1030, 1040). If the images do not compare, a message to call the security office is displayed (state 1050), and the ERC 10 software returns to waiting for an employee ID scan (state 1020). If the images compare properly, the gate or door of a restricted area is unlocked for a set period (state 1060), the electronic security log is updated (state 1070), and after a set period, the ERC software returns (state 1080) to waiting for an employee ID scan (state 1020).

Figure 8B:
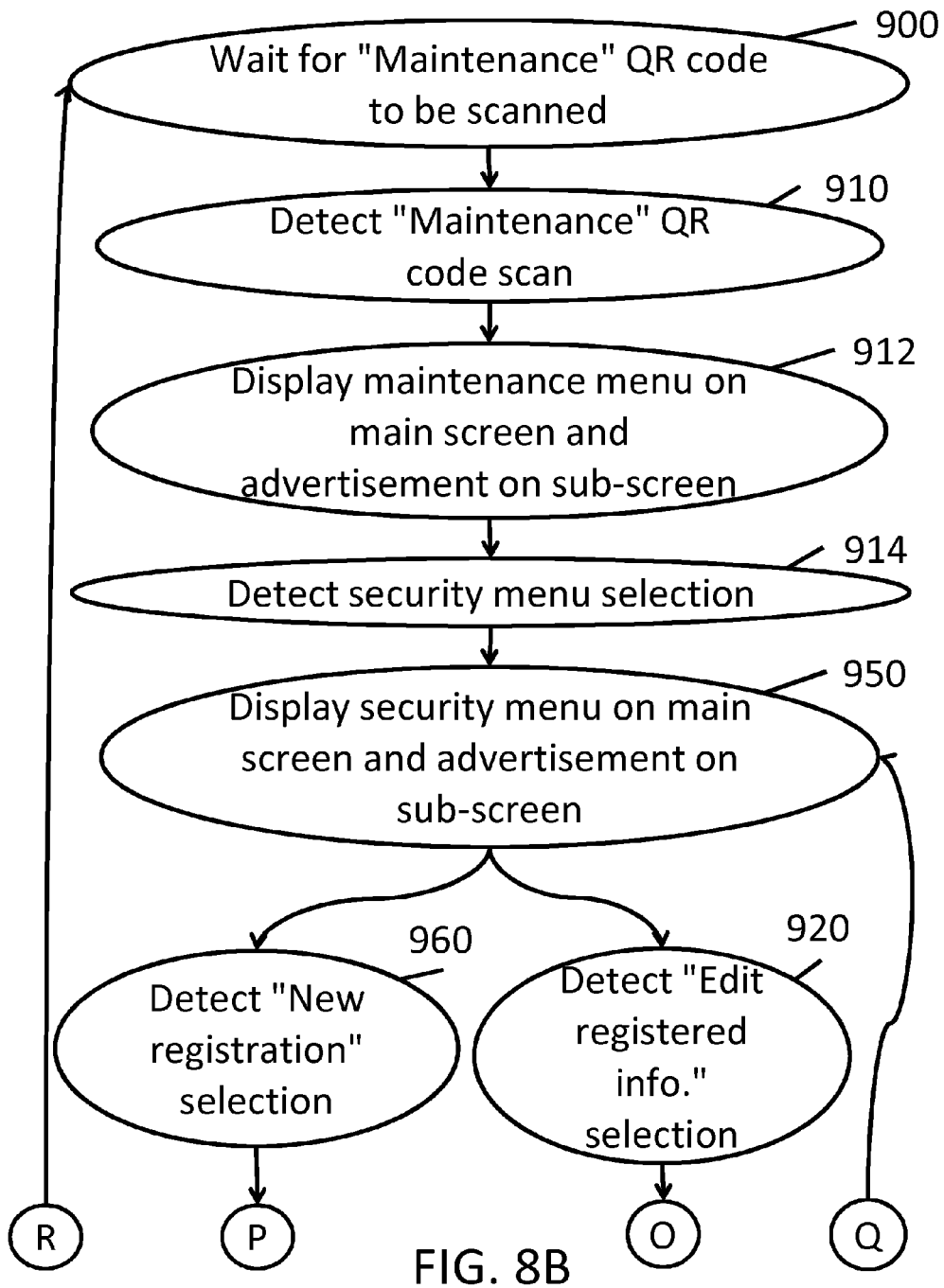
FIG. 8B is a state machine diagram of the present invention in Security Mode.
Figure 8C:
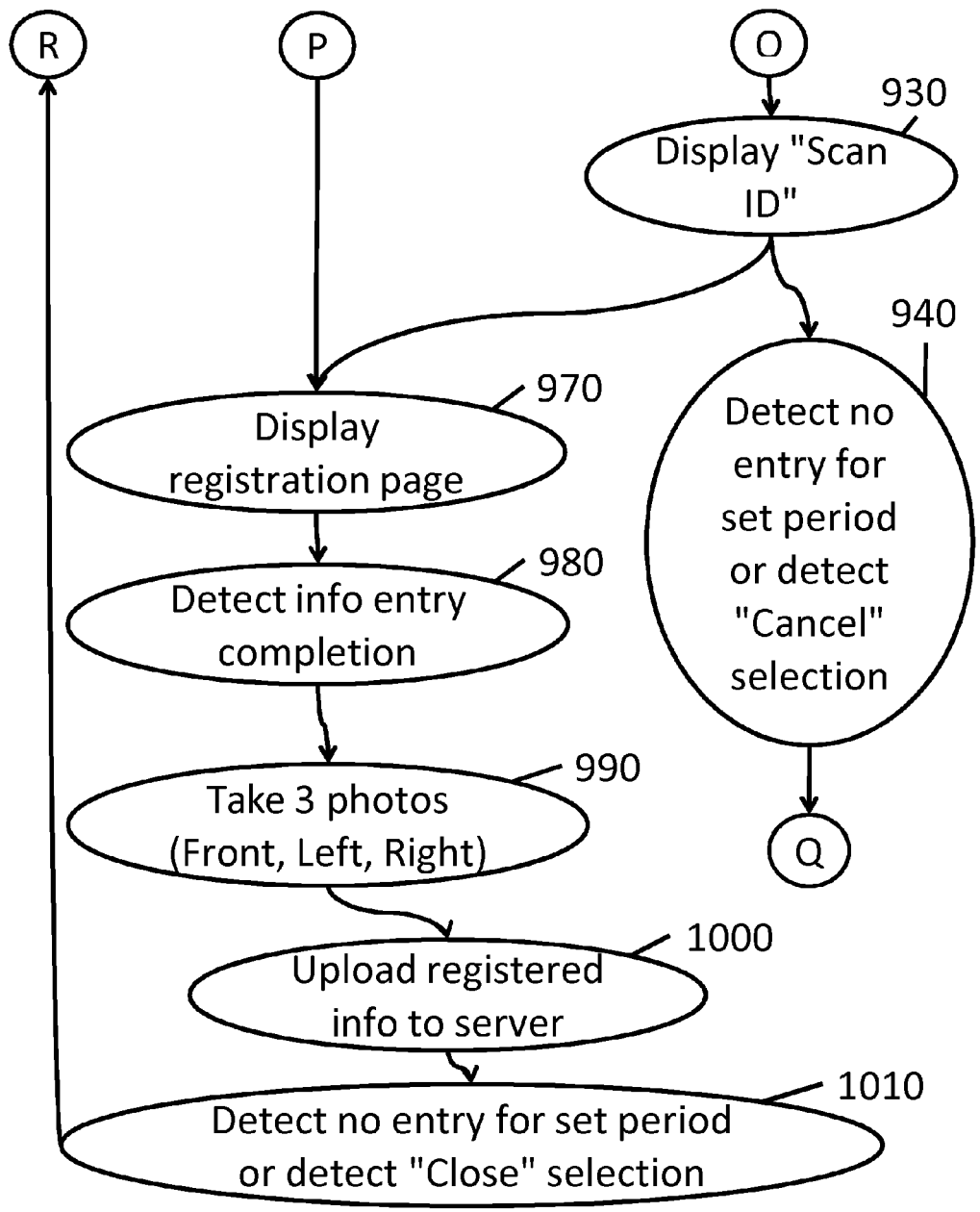
FIG. 8C is a state machine diagram of the present invention in Security Mode.

Referring now to FIGS. 8B, 8C, state machine diagrams of the Emergency Response Center 10 operating in Security Mode, Data Management are illustrated. The ERC 10 software is waiting for a maintenance code to be scanned by the bar-code scanner 70 or magnetic stripe card reader 60 (state 900). When a maintenance code scan is detected, the maintenance menu is displayed (states 910, 912). In the maintenance menu, if the security option is selected, the security menu is displayed on the video screen 40 (states 914, 950). At the security menu the user may select either "new registration" (state 960), or "edit registered information" (state 920). If a "new registration" is selected (state 960), the registration page is selected (state 970), data is entered by the user (state 980), user photos are taken by the security camera 30 (state 990), and the new data is uploaded to the ERC server 20 (state 1000). If no entry is detected for a set period, the ERC 10 software then returns to "wait for maintenance code" (state 900). At the security menu (state 950), if "Edit Registered Info" is selected (state 920), the scan ID is displayed (state 930), and the ERC 10 software resumes at the display registration page (state 970) above.

Figure 9F:
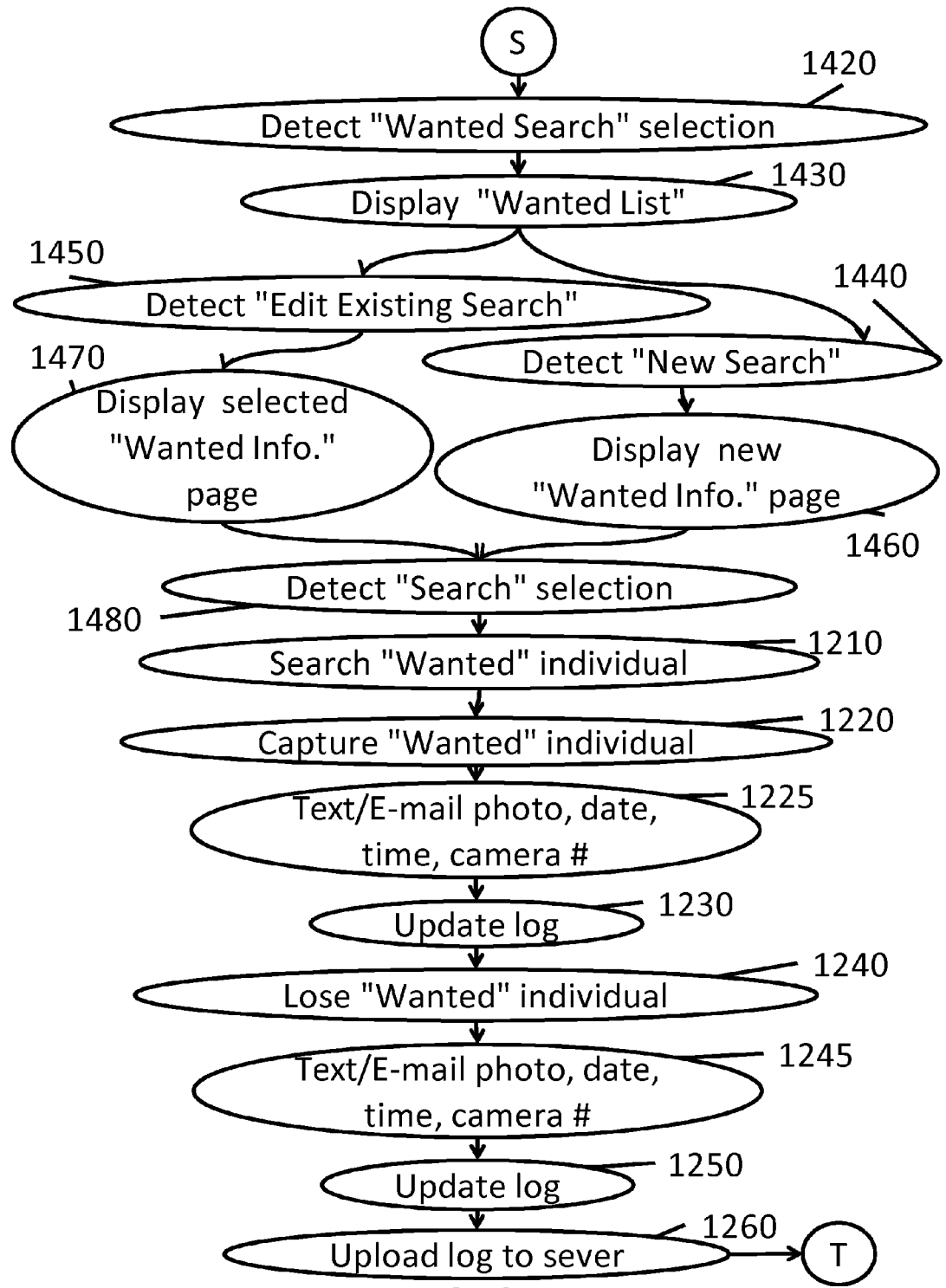
FIG. 9F is a state machine diagram of the present invention in Surveillance Mode.
Figure 9G:
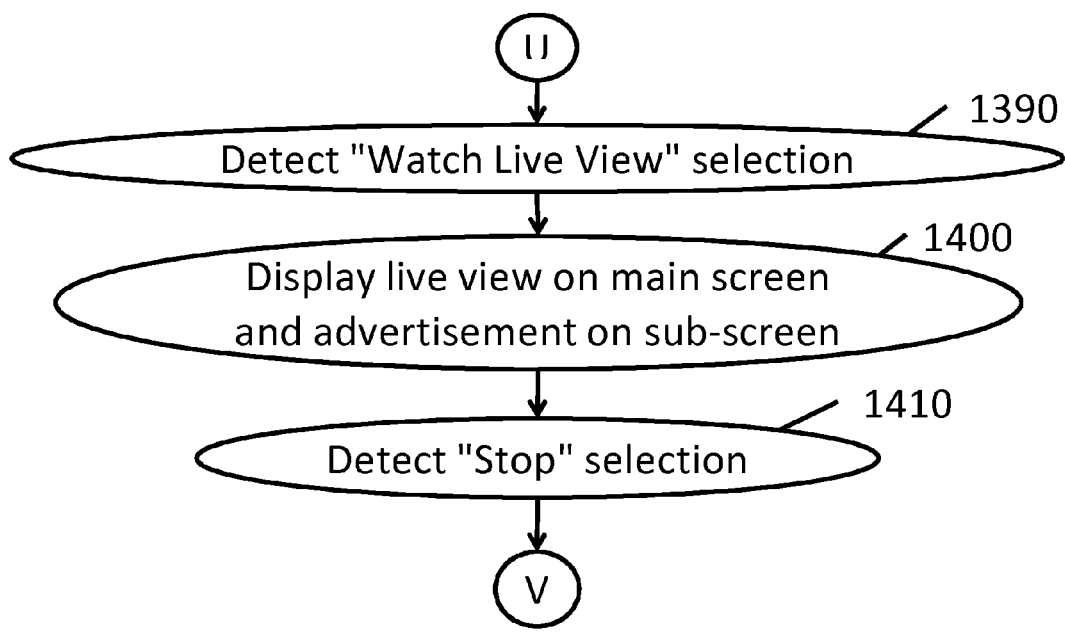
FIG. 9G is a state machine diagram of the present invention in Surveillance Mode.

FIGS. 9A, 9B, 9C, 9D, 9E, 9F, 9G, illustrate state machine diagrams of the ERC 10 operating in various Surveillance Modes. In FIG. 9A, the ERC 10 records video data continuously while deleting old data (state 1200). In FIGS. 9B, 9C, 9D, 9E, 9F, 9G, the ERC 10 operates in Surveillance Mode, Video Data Management mode. The ERC 10 is waiting for a maintenance code to be scanned by the ERC maintenance staff in state 1265. When a maintenance code scan is detected, the maintenance menu is displayed (states 1267, 1269). In the maintenance menu, if the surveillance option is selected, the Surveillance menu is displayed on the video screen 40 (states 1270, 1280). The user may now select "Wanted Search Selection" (state 1420), "Watch Live View" (state 1390), "Burn DVD" (state 1350), "Play recorded video" (state 1320), or "Transfer recorded video" (state 1290).

When the "Wanted Search" (state 1420) is selected, the ERC 10 software displays a wanted list (state 1430). The user may then select "Edit Existing Search" or else "New Search" (states 1450, 1440). Selecting "Edit Existing Search" will display the "Wanted Info" page (state 1450, 1470), while selecting "New Search" will display a new "Wanted Info" page (states 1440, 1460). The ERC 10 software then continues at detect "Search" selection (state 1480), and searches for a wanted individual in state 1210. The wanted individual is selected (captured) by the ERC 10 and the individual is texted or e-mailed with a photo, date, time and camera number (states 1220, 1225). The ERC 10 log is then updated (state 1230), and the wanted individual is lost (state 1245). Another individual is then texted or emailed (state 1245) and the log is updated again (state 1250). The log is then uploaded to the ERC server 20 (state 1260). When "Watch Live View" (state 1390) is selected, the user may watch a live surveillance view on the video screen 40 until Stop is selected (states 1400, 1410). When "Burn DVD" (state 1350) is selected, a DVD is burned and message is displayed on the video screen 40 (states 1360, 1370). When "Play recorded video" (state 1320) is selected, a recorded video is displayed on the video screen 40, until "Stop" is selected or the end of the video is reached (states 1330, 1340). When "Transfer recorded video" (state 1290) is selected, the recorded video is transmitted over the Internet via FTP until the FTP process is completed (states 1300, 1310). After completion of any of the Surveillance menu selections, the ERC video display 40 displays the Surveillance menu again (state 1280).

That which is claimed is:

1. An emergency response machine comprising:
a frame;
a storage system for emergency equipment;
a plurality of surveillance devices;
a processor;
an electronic storage device;
one or more touch screen video devices;
one or more audio devices;
a wireless communication system;
a wired communication system;
a printer; and
computer executable instructions operative on the processor for:
vending, printing, and electronically transmitting coupons to a user;
displaying instructions, information, and advertisements on said video devices.

2. The emergency response machine of claim 1, wherein said storage system includes separate storage bins for medical equipment and hazardous material response kits.

3. The emergency response machine of claim 1, further including:
an uninterruptible power supply;
electronic means to output messages on said audio devices;
computer executable instructions operative on the processor for:
displaying messages on said video devices;
performing video conferencing with remote personnel;
performing audio conferencing with remote personnel.

4. The emergency response machine of claim 1, further including:
computer executable instructions operative on the processor for:
updating said advertisements displayed on said video devices;
updating said coupons displayed on said video devices;
updating web links displayed on said video devices.

5. The emergency response machine of claim 1, further including:
a plurality of surveillance cameras mounted on the emergency response machine;
electronic means for recording video data produced by the surveillance cameras;
electronic means for transmitting video data via the network communication system;
computer executable instructions operative on the processor for:
storing surveillance images in a database;
transmitting surveillance images to a remote user;
updating a system log;
displaying stored surveillance data on said video devices;
copying stored surveillance data onto removable media.

6. The emergency response machine of claim 1, further including:
a processor configured to receive emergency alerts;
a plurality of visual and audio alarm devices;
computer executable instructions operative on the processor for:
transmitting warning messages via said communication systems to designated authorities;
activating the visual and audio alarm devices during emergency conditions.

7. The emergency response machine of claim 1, further including:
a user ID reader configured to read user data;
a scanner configured to scan user images;
computer executable instructions operative on the processor for:
reading user ID data and images from a database;
verifying user IDs based on user data and images;
updating system log data.

8. The emergency response machine of claim 1, further including:
a user ID reader configured to read user data;
a camera configured to record user images;
computer executable instructions operative on the processor for:
storing user ID data and user images into a database;
updating system log data.

9. The emergency response machine of claim 1, further including:
computer executable instructions operative on the processor for:
playing recorded video messages;
recording data on removable media;
transmitting recorded video messages to remote users.

10. A computerized method for managing an emergency response machine, the method comprising:
displaying emergency messages on video devices;
playing emergency messages on audio devices;
performing video conferencing;
storing emergency response kits;
displaying instructions, information, and advertisements on video devices;
vending and printing tickets and coupons;
recording user registration data in a database;
photographing objects and transmitting the photos to a user's electronic device;
vending cell phone applications;
recording video data produced by surveillance cameras;
transmitting video data via the network communication system;
transmitting warning messages to designated authorities;
activating visual and audio alarm devices when alert conditions occur.

11. An emergency response machine comprising:
a frame;
a storage system for emergency equipment;
a plurality of surveillance devices;
one or more video devices and associated electronics;
one or more audio devices and associated electronics;
a wireless communication system;
a wired communication system;
a computer processor;
an electronic storage device;
electronic means for recording and analyzing data;
a printer configured to issue coupons to users;
an uninterruptible power supply;
computing means to perform video conferencing with remote personnel;
computing means to perform audio conferencing with remote personnel;
computing means to display instructions, information, and advertisements on video devices;
computing means to register user data and images;
means to vend and print movie tickets;
a plurality of surveillance cameras and associated electronics;
means for recording surveillance camera data;
means for transmitting video data via the network communication system;
computing means to send warning messages via the network communication system to designated authorities;

a plurality of visual and audio alarm devices;
means to activate the visual and audio alarm devices at appropriate times.

12. An emergency response machine comprising:
a frame;
a storage system for emergency equipment;
one or more surveillance devices;
a processor;
an electronic storage device;
one or more video devices;
one or more audio devices;
one or more alarm devices;
a network communication system; and
computer executable instructions operative on the processor for:
   vending coupons and electronically transmitting coupons to a user;
   displaying information on said video devices;
   activating said alarm devices during emergency conditions;
   managing data produced by said surveillance devices.

* * * * *